2 Sheets—Sheet 1.

C. B. HOLDEN.

Assignor, by mesne assignments, to W. H. FIELD.

Horse Hay-Rake.

No. 8,475. Reissued Nov. 5, 1878.

Witnesses.

Harry King
sec.

William Blackstock.

Inventor.

Cyrus B. Holden.

By L. Hice.

His Atty.

N. PETERS, PHOTO-LITHOGRAPHER, WASHINGTON, D. C.

2 Sheets—Sheet 2.

C. B. HOLDEN

Assignor, by mesne assignments, to W. H. FIELD.

Horse Hay-Rake.

No. 8,475. Reissued Nov. 5, 1878.

Witnesses.

Harry King.

William Blackstock.

Inventor.

Cyrus B. Holden

By L. Hice,

His Atty.

N. PETERS, PHOTO-LITHOGRAPHER, WASHINGTON, D. C.

UNITED STATES PATENT OFFICE.

CYRUS B. HOLDEN, OF WORCESTER, MASSACHUSETTS, ASSIGNOR, BY MESNE ASSIGNMENTS, TO WILLIAM H. FIELD, OF PORT CHESTER, NEW YORK.

IMPROVEMENT IN HORSE HAY-RAKES.

Specification forming part of Letters Patent No. 76,760, dated April 14, 1868; Reissue No. 8,475, dated November 5, 1878; application filed August 22, 1878.

*To all whom it may concern:*

Be it known that I, CYRUS B. HOLDEN, of Worcester, in the county of Worcester and State of Massachusetts, have invented certain new and useful Improvements in Horse Hay-Rakes; and I do hereby declare the following to be a full, clear, and exact description of the same, reference being had to the accompanying drawings, forming part of this specification, in which—

Figure 1:
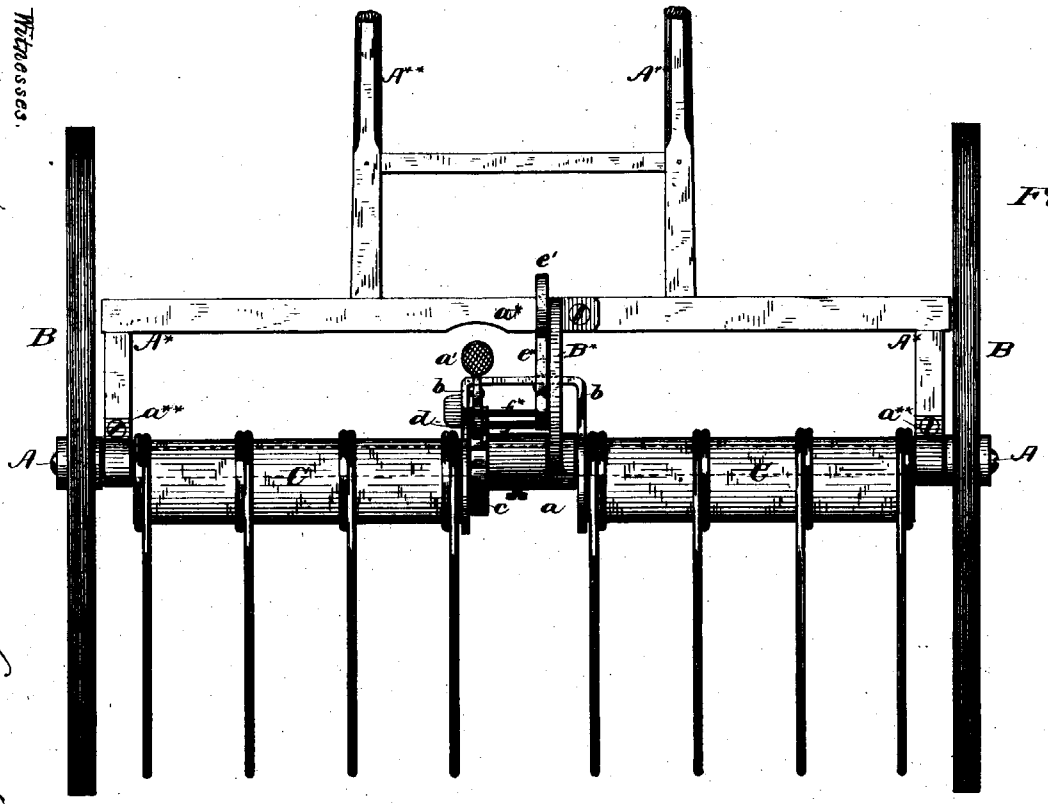
Figure 3:
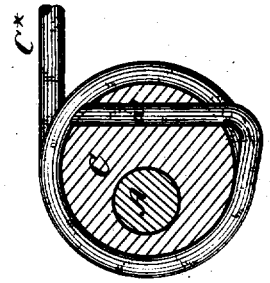
Figure 2:
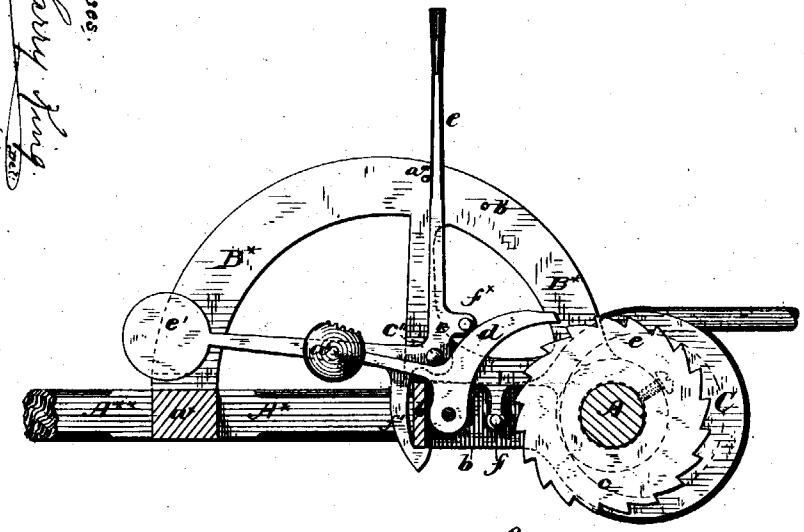

Figure 1 is a plan view of a hay-rake made according to my invention. Fig. 2 is a vertical longitudinal section of the same. Fig. 3 is a transverse section also, on an enlarged scale, of one portion of the same.

Similar letters of reference in the several figures denote the same parts.

This invention relates to that class of wheeled hay-rakes in which the rake-teeth are tilted or lifted to discharge the hay in windrows by the traction of the apparatus, instead of by the employment of muscular force; and it consists, first, in the combination of a revolving main axle with an oscillating rake-head, mounted on said axle as its support and center of oscillation; secondly, in combining said oscillating rake-head and revolving axle with a ratchet and dog, whereby the teeth may be lifted by the power of the team at the will of the operator; thirdly, in constructing said rake-head in two parts, connected by a yoke, and combining it with a ratchet-wheel arranged on the revolving axle between said two parts; fourthly, in combining with said oscillating rake-head, revolving axle, ratchet, and pawl or dog a stop, against which the pawl or dog strikes at its extreme forward movement to release the rake-head and allow the teeth to fall back by their own gravity; fifthly, in combining such draft-frame with the revolving axle by three connections—viz., one at or near each supporting wheel-hub, and one at or near the middle of the rake; and, sixthly, in a peculiar construction and arrangement of the rake-head upon the axle, whereby the teeth are attached to and supported directly by the rake-head, without the intervention of a lifting-bar or tooth-guide, and whereby the rake-head and axle are at the same time so combined and arranged as to form an exceedingly compact and simple structure.

To enable others to understand the construction and operation of my invention, I will proceed to describe it with reference to the drawings.

The rake is formed with a cylindrical axle, A, provided with the two supporting-wheels B, one of which is firmly keyed or otherwise attached to said axle, while the other is loose thereon, so that the axle will revolve continuously forward while the rake is advancing, and at the same time provision will be made for any unequal movement of the supporting-wheels.

A* is a horizontal draft-frame, affixed to the thills A**, by which the rake is drawn, and supported by said thills and by the axle, to which it is articulated near the inner ends of the supporting-wheel hubs. Said draft-frame is constructed with a stout cross-bar, *a**, attached to the rear ends of the thills, and projecting laterally beyond their sides in a direction parallel to the axle, and to such a distance as to provide a suitable support for the two connecting-pieces *a*** *a***, which extend to the axle and are hinged thereto, near the wheel-hubs, as above described.

This construction enables the rear ends of the thills to be arranged at a suitable distance apart, and at the same time transfers the draft-strains to the axle at points so close to its terminal bearings that it will be thereby protected from accidental bending under said strains.

C is the rake-head, to which are connected the gathering-teeth. This head is so constructed as to be capable of oscillating to raise and drop the teeth for the purposes of dumping the gathered hay and resetting the rake for work; and it is so mounted on the rake that its center of oscillation coincides with the center of rotation of the axle, whereby those parts of the dumping mechanism that are connected respectively to the axle and rake-head are not displaced or thrown out of their proper relative position by the oscillation of the head or rotation of the axle.

The form of the rake-head is designed for the direct attachment of the teeth to it without the necessity of other support for them, and its special mode of support upon the axle has the effect of bringing the parts close together, rendering the rake-structure simple and compact.

To these ends the head is made tubular, of cylindrical form, and with a longitudinal bore, which is eccentric to the circumference thereof, as shown more fully in Figs. 2 and 3, and has passed through it the axle A, just mentioned.

The head C, instead of being formed of one continuous piece, is made in two parts, the innermost ends of which are at some little space apart, as shown at *a*, and which are connected by a forwardly-extending yoke, *b*, as indicated in Fig. 1.

The eccentric form, just hereinbefore described, of the tubular head C causes one side thereof to be much thicker than the other, so that holes may be provided transversely therein, as shown in Fig. 3, in such manner that the inner ends, *a''*, of the wire teeth C* may be passed through and secured in such holes, the teeth being coiled one or more times around the aforesaid head, and having their main length or portion of an ordinary or suitable form or curvature.

Attached to the axle in the space *a* between the two parts of the tubular head is a ratchet, *c*, and pivoted to one side of the yoke *b* is a pawl, *d*, provided with a weight, *a'*, which operates to keep the pawl out of gear or contact with the ratchet *c*, except when the same is acted upon by the lever *e*, as hereinafter fully explained.

The lever *e* is pivoted at *c''* to the lower part of a semicircular vertical frame, B*, which extends from the axle at the space *a*, just hereinbefore mentioned, to the cross-bar *a** of the draft-frame A*, the frame B* having provided upon it two studs, *a''' b'*, which limit the vibratory movement of the lever.

The lever *e* is formed with a forwardly-extending arm, *e**, having at its extremity a weight, *e'*, which tilts forward the lever, which, furthermore, has at one side a stud or pin, *f**, which extends over the pawl *d* in such manner as to force such pawl into gear with the ratchet *c* when the lever *e* is pulled back.

Extending downward from the lever *e* is a hook, *f'*, which, when the lever is thrown forward by the weight *e'*, catches under the front or forward part of the yoke *b*, and thus prevents the rising of the rake-teeth C* while gathering the hay or grass, as hereinafter more fully explained.

Provided upon the lower part of the frame B*, and below the pawl *d*, is a stud, *f*.

When the rake is drawn forward, with the hook *f'* under the front of the yoke *b*, the teeth C* are prevented from tilting upward, and the grass or hay is gathered before them until it is desired to deposit the same in a windrow, whereupon the lever *e* is moved back and presses the pawl *d* into gear or contact with the ratchet *c*. The ratchet *c*, attached to the axle, rotated by the wheel B, firmly secured thereto, being thus connected with the pawl *d* of the head C, carries the same around a portion of a revolution, thereby raising or tilting upward the teeth and discharging the hay or grass therefrom. By the time this is done the pawl *d* strikes the stud *f*, which, by preventing its farther movement in a downward direction, brings it clear from the ratchet-wheel *c*, thus enabling the teeth C* to fall by their own weight to their first position. When the lever *e* is released it is brought forward to its original place by the weight *e'*, with its hook *f'* catching underneath the front of the yoke *b*, to hold the teeth in place while gathering the hay for the next windrow or deposit, while the pawl *d* is kept clear of the ratchet *c* by means of its weight *a'*, all as hereinabove explained.

Having thus described my invention, I claim as new—

1. An oscillating rake-head mounted on a rotating axle, and having bearings through which the axle rotates when the rake is advancing, substantially as described.

2. An oscillating rake-head mounted on a rotating axle, in combination with a rotating ratchet-wheel and a device for connecting the rake-head to the ratchet at the will of the operator, for the purpose of raising the teeth and discharging the hay when the rake is advancing.

3. A rake-head composed of two parts, connected by a yoke, in combination with a ratchet-wheel rotating between the parts when the rake is advancing, and a device for connecting the rake-head to the ratchet-wheel, for the purpose of raising the teeth and discharging the hay.

4. In a wheeled horse hay-rake, the combination of a revolving axle, a rocking head mounted on said axle as its center of oscillation, a lifting ratchet-wheel attached to said axle and revolving therewith, a pawl or detent attached to the head and capable of engaging with the ratchet to dump the load, and a stop against which the pawl or detent strikes at its extreme forward movement to automatically release it from the ratchet and reset the rake-teeth, substantially as described.

5. In a wheeled horse hay-rake, a revolving axle having a central lifting-wheel, combined with a draft-frame having a long rear cross-bar, *a**, with end and middle connections to the axle, constituting bearings in which said axle rotates, substantially as described.

6. The tubular head C, composed of two parts, connected by the yoke *b*, in combination with the axle A, the ratchet *c*, and pawl *d*, substantially as and for the purpose specified.

7. The arrangement and combination of the hook *f'* and yoke *b* with the tubular head C and its teeth C*, substantially as set forth.

8. The tubular head C, arranged eccentrically upon the axle A, in such manner as to permit the innermost ends of the teeth C* to be passed through such tubular head without interfering with the axle, substantially as and for the purpose specified.

Witnesses: C. B. HOLDEN.

W. A. GILE,

J. S. WHEELER.